US 8,159,495 B2

(12) United States Patent
Carter-Schwendler et al.

(10) Patent No.: US 8,159,495 B2
(45) Date of Patent: Apr. 17, 2012

(54) REMOTING SUB-PIXEL RESOLVED CHARACTERS

(75) Inventors: Carl M. Carter-Schwendler, Redmond, WA (US); Joy P. L. Chik, Sammamish, WA (US); Nadim Y. Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 11/422,513

(22) Filed: Jun. 6, 2006

(65) Prior Publication Data

US 2007/0279418 A1 Dec. 6, 2007

(51) Int. Cl.
*G06T 11/20* (2006.01)
(52) U.S. Cl. ........................................................ 345/467
(58) Field of Classification Search ................ 345/467, 345/471, 469.1
See application file for complete search history.

(56) References Cited

U.S. PATENT DOCUMENTS

| | | | |
|---|---|---|---|
| 5,883,640 A * | 3/1999 | Hsieh et al. ................... 345/503 |
| 6,065,008 A * | 5/2000 | Simon et al. ................... 707/10 |
| 6,236,390 B1 | 5/2001 | Hitchcock | |
| 6,252,671 B1 * | 6/2001 | Peng et al. ................... 358/1.11 |
| 6,356,278 B1 | 3/2002 | Stamm et al. | |
| 6,563,502 B1 | 5/2003 | Dowling et al. | |
| 6,657,625 B1 * | 12/2003 | Chik et al. ................... 345/467 |
| 6,725,421 B1 * | 4/2004 | Boucher et al. ................ 715/205 |
| 6,738,526 B1 | 5/2004 | Betrisey et al. | |
| 7,006,107 B2 | 2/2006 | Dowling et al. | |
| 7,333,110 B2 * | 2/2008 | Arnold et al. ................ 345/467 |
| 2003/0095135 A1 * | 5/2003 | Kaasila et al. ................ 345/613 |
| 2004/0061703 A1 * | 4/2004 | Chik et al. ................... 345/467 |
| 2004/0102245 A1 * | 5/2004 | Escalera et al. ................ 463/32 |

FOREIGN PATENT DOCUMENTS

EP 1345205 9/2003

* cited by examiner

*Primary Examiner* — Edward Martello
(74) *Attorney, Agent, or Firm* — Workman Nydegger

(57) ABSTRACT

Remoting sub-pixel defined text. Text is remoted at sub-pixel precision in a computing environment including a terminal server and a terminal client. At a terminal server text definitions are generated. The text definitions include character definitions defining character boundaries with colors so as to be able to define character boundaries using sub-pixel precision by defining colors at the boundaries so as to make use of sub-pixel color components of LCD pixels when the characters are rendered on an LCD screen. At the terminal server glyphs of individual characters are generated. The glyphs include the character definitions including definitions of colored character boundaries. At the terminal server, the glyphs are sent to a terminal client. At the terminal client, the glyphs are blended with background color information and rendered on an LCD screen.

16 Claims, 2 Drawing Sheets

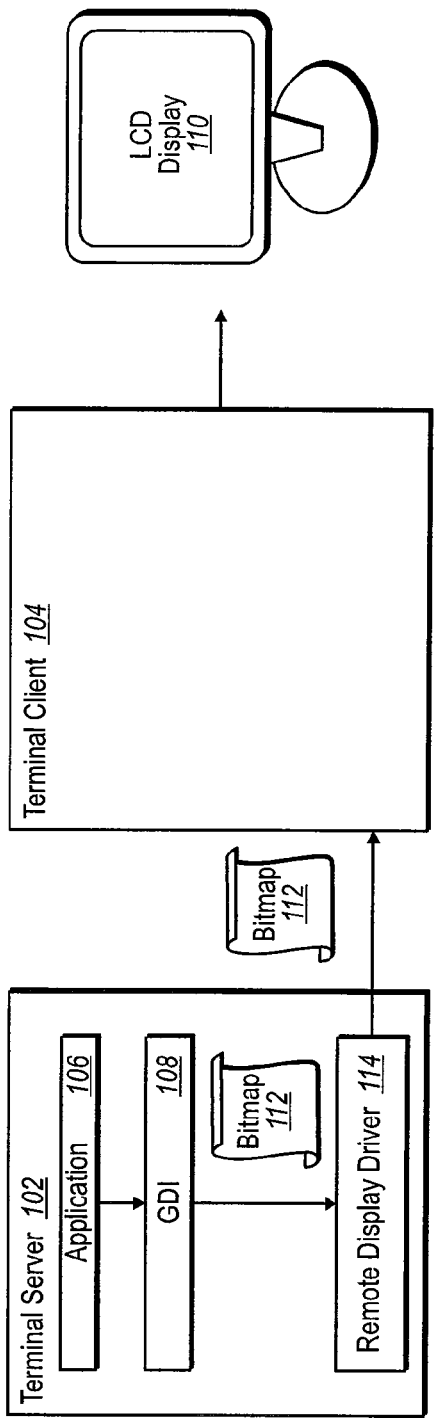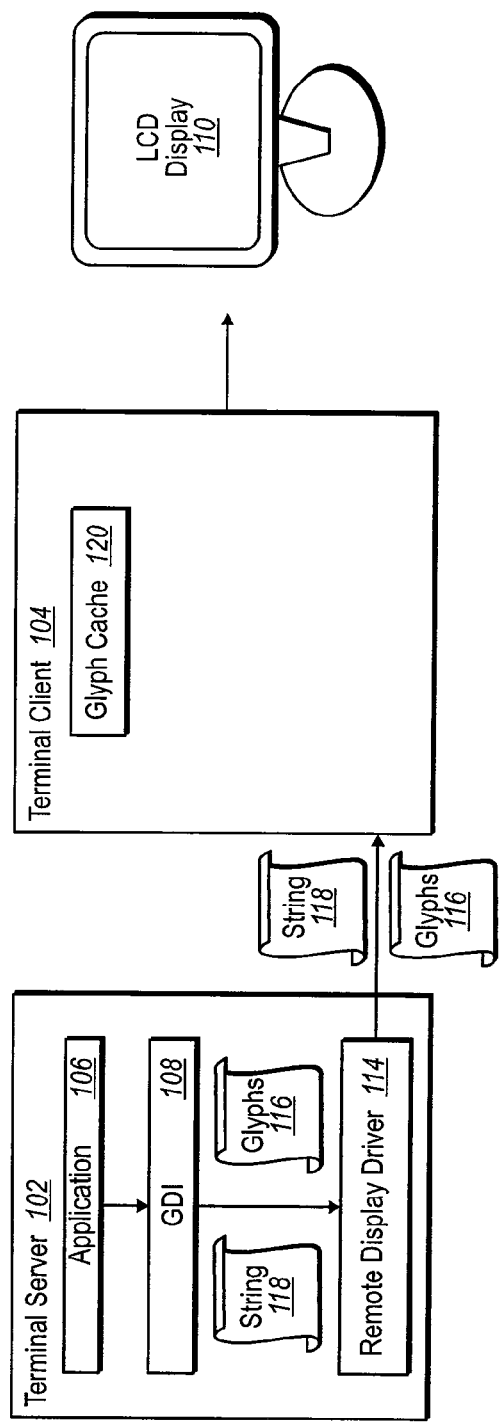

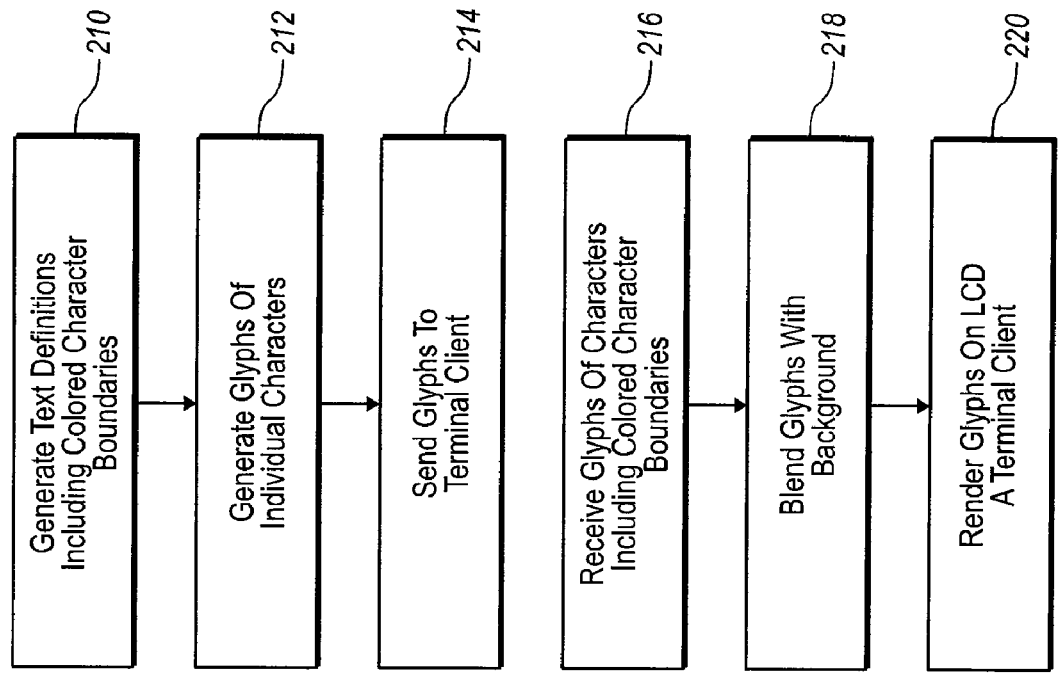
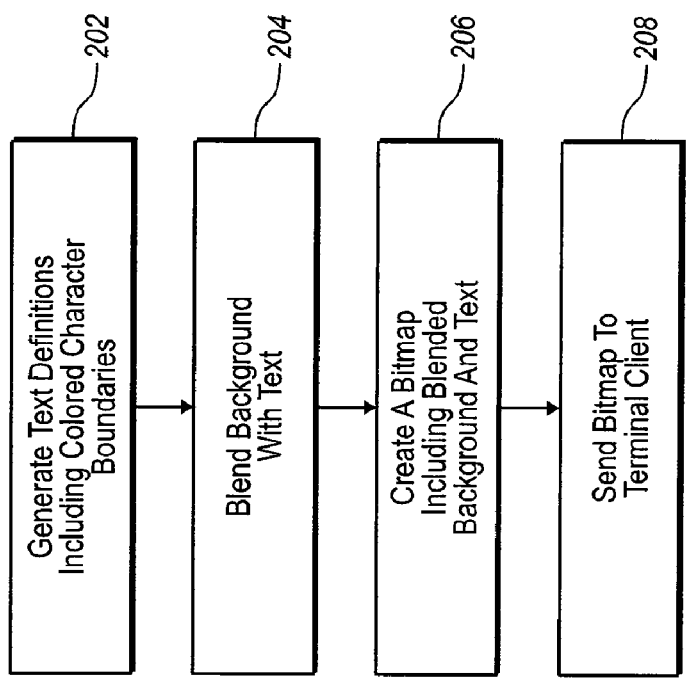
FIG. 2B
FIG. 2A

REMOTING SUB-PIXEL RESOLVED CHARACTERS

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections. Computer networks may allow for resources and services to be available on a network. Such resources and services may be, for example and not limited to, file servers for storing data accessible by the clients, print servers for providing access to printers to the clients, and shared stores on client computers for storing data to be made available to other clients and resources on the network.

One example of the functionality provided by networked computers relates to the ability to provide terminal services from a server computer. These types of services may also be referred to as an application server. A terminal server may provide computing functionality to one or more terminal clients. In this example, terminal clients connect to a terminal server where the terminal server is able to provide computing power for executing applications and performing other computing functions requested at the terminal clients. In this fashion, the processing power of a terminal server can be leveraged such that several terminal clients can utilize the processing power of the terminal server. A powerful terminal server can provide computing functionality to 100s of clients simultaneously.

Applications at a terminal server send display information to the terminal client which can be displayed to a user at the display at the terminal client. For example, the terminal server may send text to be displayed at the terminal client. It is desirable for maintaining system performance to limit the amount of information that is sent between the terminal server and the terminal client. Presently, in the context of displaying text, this is accomplished by only sending monochrome glyphs which are black and white bitmaps representing a letter in a particular font to the terminal client. The terminal client can cache the glyphs such that a glyph for each letter in each font only needs to be sent once. After that, strings can be sent where the glyphs are used to render the strings at the client. The glyphs can be further compressed using standard compression techniques.

Modernly, new display technologies are being implemented. One such technology relates to LCD displays. Each pixel of an LCD display typically has three vertically arranged sub-pixel components, namely a red sub-pixel component adjacent to a green sub-pixel component, adjacent to a blue sub-pixel component, adjacent to the red sub-pixel component in the next pixel, etc. Technologies have recently been developed to utilize the sub-pixel components to increase the horizontal resolution of graphics and especially text. One such technology is Cleartype available with certain Microsoft Windows products available from Microsoft Corporation of Redmond Wash. In one example, sub-pixel components can be used to represent spatially different portions of a character. Thus, at the edge of a character that is rendered using this type of rendering, the character has color instead of being just black or white as is the case in portions of the character away from the edges of the character. As such, sub-pixel component text rendering has not been remoted to terminal clients due to the color variations at the edges of characters.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is a method that may be practiced in a computing environment including a terminal server and a terminal client. The method includes acts for remoting text at sub-pixel precision. The method includes generating text definitions. The text definitions include information defining character boundaries with colors so as to be able to define character boundaries using sub-pixel precision by defining colors at the boundaries so as to make use of sub-pixel color components of LCD pixels when the characters are rendered on an LCD screen. A background on which the text is to be displayed is blended with colored portions of the characters. A bitmap is created including the blended characters and background. The bitmap is sent to a terminal client.

In another embodiment, a method may be practiced in a computing environment including a terminal server and a terminal client. The method includes acts for remoting text at sub-pixel precision. The method includes at a terminal server generating text definitions. The text definitions include character definitions defining character boundaries with colors so as to be able to define character boundaries using sub-pixel precision by defining colors at the boundaries so as to make use of sub-pixel color components of LCD pixels when the characters are rendered on an LCD screen. At the terminal server glyphs of individual characters are generated. The glyphs include the character definitions including definitions of colored character boundaries. At the terminal server, the glyphs are sent to a terminal client.

In yet another embodiment, that may be practiced in a computing environment including a terminal server and a terminal client, a method of remoting text at sub-pixel precision is disclosed. The method includes at the terminal client receiving glyphs of characters. The glyphs include defined character boundaries with colors so as to be able to define character boundaries using sub-pixel precision by defining colors at the boundaries so as to make use of sub-pixel color components of LCD pixels when the characters are rendered on an LCD screen. At the terminal client, the glyphs are blended with background color information. At the terminal client, the glyphs are rendered on an LCD screen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1A illustrates a topology for remoting sub-pixel rendered text;

FIG. 1B illustrates a topology for remoting colored glyphs using sub-pixel resolution;

FIG. 2A illustrates acts performed at a terminal server for remoting sub-pixel rendered text; and FIG. 2B illustrates acts performed at a terminal server and a terminal client for remoting colored glyphs using sub-pixel resolution.

DETAILED DESCRIPTION

Embodiments herein may comprise a special purpose or general-purpose computer including various computer hardware, as discussed in greater detail below.

Some embodiments described herein allow text rendering using sub-pixel components, such as the red, green and blue sub-pixel components of an LCD screen, to be accomplished in terminal clients. In one embodiment, this may be accomplished by performing sub-pixel text rendering at a remote display driver at a terminal server. The sub-pixel text rendering at the terminal server results in the edges of the rendered characters having color variations. Color blending is applied at the edges of characters to compensate for the color of the background on which the characters are to be displayed. This may often be performed on a string of characters. A bitmap image is then created of a character or the string of characters including background blending. The bitmap is then remoted to the terminal client where it can be displayed on an LCD monitor such that the characters can be displayed with sub-pixel precision.

In another embodiment, glyphs may be created at a terminal server for single characters or characters in a string. The glyphs are created with sub-pixel precision based on LCD styled sub-pixel components. This results in glyphs that differ from previously disclosed glyphs, in that the present glyphs include color (i.e. not simply black and white) portions at the edges of the glyph. Additionally, in one embodiment, colored glyphs may also include an alpha value (A) indicating the appropriate amount of transparency for a given pixel. This information is used to correctly blend the glyph 'color' with the background image. For example, a glyph pixel might have a color of 'red' and an alpha value (or transparency) of 70%. This may be represented as an ARGB value using 32-bits per pixel (8 per channel of R,G,B and A). This color+alpha combination can then be blended at the client to produce the correct pixel value.

The glyphs along with text strings are then sent to the terminal client. The terminal client can use the text strings and glyphs to display text in the appropriate font at an LCD display at the terminal client. Background blending can be applied at the terminal client by using the color information about the edges of a glyph in combination with background information.

Referring now to FIG. 1A, one exemplary embodiment is illustrated. FIG. 1A illustrates a terminal server 102 connected to a terminal client 104. The terminal server 102 has an application 106 installed on it. The application 106 may be any appropriate application that generates text for display. The application 106 may include functionality for font size and type selection. For example, a user may be able to specify to the application 106 a particular true-type font and a particular point size for which various text objects should be generated. The application communicates with the Graphical Device Interface (GDI) 108. In this example, the GDI 108 creates a bitmap image 112 of a character or string of characters.

Referring now to FIG. 2A, method acts are illustrated for actions performed at the terminal server 102 for the example illustrated in FIG. 1A. As described previously, the bitmap image 112 may be created using various algorithms and processes appropriate for displaying text strings using sub-pixel precision for display on an LCD display. FIG. 2A illustrates an act of generating text definitions including colored character boundaries (act 202). The boundaries of characters are defined with colors so as to be able to define character boundaries using sub-pixel precision by defining colors at the boundaries so as to make use of sub-pixel color components of LCD pixels when the characters are rendered on an LCD screen. For example, in one embodiment, characters in a true-type font may be rasterized at a lager scale than normal. For example, a black and white character may be stretched by a factor of 3× in a horizontal direction to create a stretched glyph when characters are being formatted. This is done such that each pixel of the black and white character now is represented by three pixels representing the three sub-pixel components of the pixel. Colors are then applied to each pixel horizontally corresponding to sub-pixel component positioning. The stretched glyph is then scaled back down to a 1:1 height to width ratio sized glyph using sub-pixel component rendering algorithms to create a colored sub-pixel glyph. FIG. 2A further illustrates an act where the text rendered with sub-pixel precision is blended with a background on which the text is to be displayed (act 204). For example, when the boundaries of a colored sub-pixel glyph are rendered on a colored background, appropriate blending to facilitate readability should be performed. One exemplary system for sub-pixel precision glyph definitions is described in U.S. Pat. No. 6,188,385 titled "Method and Apparatus for Displaying Images Such as Text" issued to Hill et al. on Feb. 13, 2001. This document is merely exemplary and other methods may also be used to define characters with sub-pixel precision and colored boundaries.

Notably, in one embodiment, the terminal client 104 may provide data to received by the terminal server 102 defining characteristics regarding the LCD display 110 at the terminal client 104. Specifically, the terminal client 104 may provide information about the arrangement of sub-pixel components of the LCD display 110. For example, rather than the sub-pixel components being organized as adjacent red, green and blue components, the components may be in some other order such as red, blue and green, or any other suitable order. Alternatively, the LCD display 110 may have other non-standard features such as horizontally arranged sub-pixel components, or other arrangements. In another embodiment, the terminal client can provide pixel size an native resolution of the LCD display 100. This information can be communicated back to the terminal server 102 so that it can be used in defining characters at sub-pixel precision.

In the embodiment shown in FIG. 1A, the GDI 108 creates a bitmap 112 as illustrated at act 206. The bitmap is sent to a remote display driver 114. In one embodiment, the GDI 108 may use a draw bitmap command when sending the bitmap 112 to the remote display driver 114. The remote display driver 114 sends the bitmap to the terminal client 104 as illustrated at act 208. The terminal client 104 can then display the bitmap on the LCD display 110 with sub-pixel precision.

An alternate embodiment is illustrated in FIG. 1B. The example illustrated in FIG. 1B illustrates an example where glyphs are rendered using sub-pixel components. Glyphs are graphical representations of one or more characters. For example, a glyph may be a graphical representation of a letter "A" in 10 point Times New Roman font. Another example of a glyph may be a combination of letter such "Microsoft Word" in 12 point Arial font. These graphical representations can be reused, such that it is not necessary to resend all of the graphical information each time a particular character is to be rendered. For example, a string defined by ASCII text such as "hello world" can be sent. With the string, glyphs including graphical representations of h, e, l, o, w, r, and d can be sent. The graphical representations of l and o can be reused where appropriate. Similarly, if the graphical representation "Microsoft Word" is sent, it can be reused on all header pages of an application that include that text.

Glyphs with colored boundaries and textual strings can be sent to the terminal client. For example, FIG. 1B. illustrates the terminal server 102. The terminal server 102 includes an application 106. The application 106 may specify to the GDI 108 a particular textual string as well as a font including type and size for which the textual strings should be displayed. FIG. 2B illustrates the actions performed by the GDI 108. For example, FIG. 2B illustrates that text definitions are generated including colored character boundaries (act 210). This is done so as to be able to define character boundaries using sub-pixel precision by defining colors at the boundaries so as to make use of sub-pixel color components of LCD pixels when the characters are rendered on an LCD screen. As described previously, this may be accomplished by horizontally expanding glyphs that are black and white, coloring the expanded glyphs according to a sub-pixel component layout, and then restoring the glyphs to a one to one ratio using the red green and blue subject sub-components specified for an LCD display. FIG. 2B further illustrates that an act is performed where colored glyphs 116 (FIG. 1B) of individual characters are generated (act 212). The GDI 108 may then send the colored glyphs 116 and a text string 118 to the remote display driver 114. In one embodiment, this may be accomplished by using a specialized command. For example, a draw colored text command which is a specialized draw text command that takes into account the use of colored glyphs, i.e. glyphs with colored boundaries, can be used to send the colored glyphs 116 and text strings 118 to the remote display driver 114.

Additionally, the draw text command may also be used to send glyph positioning information. Glyph positioning information includes information on how glyphs should be spaced next to one another for readability and pleasing appearance. This may include, for example, various hinting commands or other positioning information.

Returning once again to FIG. 2B, the glyphs 116 are then sent to the terminal client 104 (act 214). Notably, in the example shown in FIG. 1B, there may be a need to send three or more different glyphs for each character of each font. This is due to the colored nature of the boundaries of each glyph. Specifically, depending on the size and positioning of a glyph, different colors may be used at the boundaries of the glyph. As such, differently colored glyphs for the same character may be sent and stored at the terminal client 104.

As described previously, glyphs may also be sent for complete words or phrases that are repeated. For example, if a phrase is repeated often in a header, footer, title, etc, it may be efficient to send glyphs that include colored character boundaries.

Notably, the glyphs may also be compressed using various compression algorithms to save on network bandwidth when the glyphs are sent across a network as described below. While standard compression techniques may be used, other more specialized compression techniques may also be used to take advantage of the particular coloring characteristics of the colored glyphs. For example, a planar compression mechanism may be used where compression is based on colored planes. For example, a glyph may be decomposed into its constituent colored portions. As described previously, red, green and blue sub-pixel components are used to render glyphs. As such, each glyph can be decomposed into red, green and blue portions. These portions can then be compressed in a similar fashion to black and white compression techniques. The compressed glyph, therefore includes a red compressed portion, a green compressed portion and a blue compressed portion.

FIG. 2B further illustrates acts that may be performed at the terminal client 104 in the example shown in FIG. 1B. For example. FIG. 2B illustrates receiving glyphs of characters including colored character boundaries (act 216). In one embodiment, received glyphs can then be stored in a glyph cache 120. This allows for conservation of network bandwidth by only sending a single character glyph for each font. Glyphs can be reused for subsequent instances of a character.

FIG. 2B further illustrates an act of blending glyphs with a background (act 218). As described previously, because of the coloring of glyph boundaries, coloring is performed by blending background colors with the glyph boundary colors. The glyphs including the blended background information, is then rendered on the LCD display 110 at the terminal client (act 220).

Notably, remoting text at sub-pixel precision may be especially useful for certain types of specialized fonts. For example, many eastern style fonts include details that are difficult to reproduce at full pixel precision on low resolution screens at font sizes typically used when trying to represent the characters on the screen. However, by using sub-pixel components for sub-pixel precision, more of the detail of such fonts can be displayed. Using the principles outlined above, these eastern style fonts can now be displayed with sub-pixel precision on terminal clients.

New sub-pixel fonts are currently being designed to make use of sub-pixel components on a local machine. When these fonts are displayed not using sub-pixel precision, the fonts can appear particularly bad. As described previously, terminal clients were not previously able to receive characters at sub-pixel precision, and thus were precluded from using these new fonts. However, using the principles described herein, the new sub-pixel component fonts can now be used with terminal services.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a terminal server and a terminal client, a method of remoting text at sub-pixel precision including remoting a single bitmap image of a string of characters from a terminal server to a terminal client, the method comprising:
    at the terminal server, prior to sending the single bitmap image to the terminal client, generating text definitions, wherein the text definitions include information defining character boundaries for a string of characters for a word or phrase that is repeated, with colors so as to be able to define character boundaries using sub-pixel precision by defining colors at the boundaries so as to make use of sub-pixel color components of LCD pixels when the string of characters is rendered on an LCD screen;
    creating the single bitmap image of the string of characters at the terminal server, prior to sending the single bitmap image to the terminal client, wherein the bitmap image includes one or more pixels of the bitmap defining one or more edges of the bitmap, each of the one or more pixels having an ARGB value defining each pixel with a color value and an alpha value defining a transparency percentage; and
    sending the single bitmap image to the terminal client, the terminal client being remote from the terminal server, including sending color values and alpha values for the one or more pixels of the bitmap, wherein the color values and alpha values are used in background blending at the terminal client by the terminal client using the color values and alpha values in combination with background information at the terminal client.

2. The method of claim 1, further comprising receiving information about the arrangement of sub-pixel components of an LCD at the terminal client and wherein generating text definitions takes into account the arrangement of sub-pixel components of the LCD at the terminal client.

3. The method of claim 2, wherein receiving information about the arrangement of sub-pixel components of an LCD at the terminal client comprises receiving an indication of the horizontal ordering of red, green and blue sub-pixel components.

4. The method of claim 2, wherein receiving information about the arrangement of sub-pixel components of an LCD at the terminal client comprises receiving an indication of pixel size and native resolution of the LCD.

5. The method of claim 1, wherein sending the bitmap to a terminal client comprises sending the bitmap to a remote display driver using a draw bitmap command and sending the bitmap from the remote display driver to the terminal client.

6. The method of claim 1, wherein generating text definitions, including character definitions defining character boundaries with colors comprises expanding text characters horizontally, applying coloring to the edge pixels and reducing the text characters to their original size.

7. In a computing environment including a terminal server and a terminal client, a method of remoting text at sub-pixel precision, the method comprising:
    at the terminal server, prior to sending one or more glyphs to the terminal client, generating text definitions, wherein the text definitions include character definitions defining character boundaries with colors so as to be able to define character boundaries using sub-pixel precision by defining colors at the boundaries so as to make use of sub-pixel color components of LCD pixels when the characters are rendered on an LCD screen;
    at the terminal server, prior to sending the one or more glyphs to the terminal client, generating the one or more glyphs wherein at least one of the generated glyphs is a combination of a plurality of characters forming a complete word or phrase that is repeated, the glyphs definitions including definitions of colored character boundaries, wherein the one or more glyphs include one or more pixels defining one or more edges of the glyph, each of the one or more pixels having an ARGB value defining each pixel with a color value and an alpha value defining a transparency percentage; and
    at the terminal server sending the glyphs to a terminal client, the terminal client being remote from the terminal server, including sending color values and alpha values for the one or more pixels of the one or more glyphs, wherein the color values and alpha values are used in background blending at the terminal client by the terminal client using the color values and alpha values in combination with background information at the terminal client.

8. The method of claim 7, further comprising compressing the glyphs prior to sending the glyphs to the terminal client.

9. The method of claim 8, wherein compressing the glyphs comprises using planar compression where individual sub-pixel component colors are compressed in individual planes corresponding to the sub-pixel component colors.

10. The method of claim 7, further comprising sending text strings to the terminal client.

11. The method of claim 10, wherein sending glyphs and text strings to the terminal client comprises sending glyphs and text strings to a remote display driver using a draw text command and sending the glyphs and text strings from the remote display driver to the terminal client.

12. The method of claim 7, wherein generating text definitions, including character definitions defining character boundaries with colors comprises expanding text characters horizontally, applying coloring to the edge pixels and reducing the text characters to their original size.

13. The method of claim 7, wherein generating text definitions comprises generating text definitions for true-type fonts.

14. The method of claim 7, wherein generating text definitions comprises generating text definitions for eastern fonts.

15. The method of claim 7, wherein generating text definitions comprises generating text definitions for sub-pixel fonts.

16. In a computing environment including a terminal server and a terminal client, wherein the terminal server provides computing functionality to one or more terminal clients by executing, at the terminal server, applications requested at the terminal clients and wherein the terminal server sends display information to the terminal clients using a remote display driver to create glyphs of the application interface, which are then sent to the terminal client to allow the terminal client to interact with the application, a method of remoting text at sub-pixel precision, the method comprising:

at the terminal client receiving one or more glyphs of characters from a terminal server, the one or more glyphs being created at the terminal server, wherein at least one or more of the one or more glyphs is a combination of a plurality of characters forming a complete word or phrase that is repeated, wherein the at least one or more of the one or more glyphs that is a combination of a plurality of characters forming a complete word or phrase that is repeated being created at the terminal server prior to being sent to the terminal client, the glyphs including defined character boundaries with colors so as to be able to define character boundaries using sub-pixel precision by defining colors at the boundaries so as to make use of sub-pixel color components of LCD pixels when the characters are rendered on an LCD screen, including receiving one or more glyphs that include one or more pixels defining one or more edges of the glyph, each of the one or more pixels having an ARGB value defining each pixel with a color value and an alpha value defining a transparency percentage;

at the terminal client blending the glyphs with background color information using the color values and the alpha values; and at the terminal client rendering the glyphs on an LCD screen; and caching glyphs at the terminal client, wherein caching glyphs at the terminal client comprises:

caching different glyphs for the same character for a particular font to account for the colored nature of the boundaries of each glyph and the size and positioning of a glyph when rendered at the terminal client; and caching a single glyph defining a string of characters defining a phrase, the method further comprising rendering the same single glyph multiple times as a result of the phrase being repeated in at least one of a header, a footer or a title.

* * * * *